UNITED STATES PATENT OFFICE.

WALTER W. WILLISON, OF NEW YORK, N. Y., ASSIGNOR TO THERMOKEPT PRODUCTS CORPORATION, OF NEW YORK, N. Y., A CORPORATION OF MAINE.

PEANUT-BUTTER.

1,398,352.　　　　　Specification of Letters Patent.　　Patented Nov. 29, 1921.

No Drawing.　　Application filed September 15, 1919.　Serial No. 323,868.

*To all whom it may concern:*

Be it known that I, WALTER W. WILLISON, a citizen of the United States, residing in New York city, borough of Manhattan, county and State of New York, have invented certain new and useful Improvements in Peanut-Butter, of which the following is a specification.

My invention relates to the method of making peanut butter, and inasmuch as I am not concerned with any particular type of apparatus for working my invention none has been illustrated. The description which follows will I believe be sufficient for any one skilled in the art to practise my invention.

The great drawback experienced with peanut butter heretofore has been the separating of the oil from the crushed peanuts, this oil rising to the surface and causing the butter to cling to the roof of the mouth when the same is eaten. This has been overcome in the present invention.

To practise the present invention peanuts are roasted and crushed or pulverized to the desired consistency, a small percentage of salt added sufficient to suit the taste, and then water in the proportion of about 10% of the mixture is added. If desired the mixture may then be exhausted of its occluded air by subjecting it to a high vacuum and finally sealed in containers under a vacuum.

Commercial peanut butter as now known contains approximately 46% oil and 17% starch, the latter being insoluble in the oil. Starch has a great affinity for water, however, which it will absorb, but in which it will not dissolve. When the water is added as above outlined the minute starch cells are caused to expand and while in their expanded condition they retain small globules of the oil. The surface tension of the starch film being greater than that of the oil, the globules of oil are prevented from uniting and rising to the surface of the butter.

I have found by experiment that after standing my improved peanut butter has no film of oil on the top thereof, as distinguished from commercial peanut butter as now known, and when eaten does not cling to the roof of the mouth; and I believe this to be due to the fact that the oil in the product is broken up into small globules with a starch and water film surrounding them, instead of being continuous as in peanut butter as it exists to-day.

It is to be understood that I am not to be limited to the addition of 10% of water as obviously this amount may be varied without departing from my invention.

What I claim is.

A food compound consisting of peanut butter, and water, the water content being substantially ten per cent. (10%) of the peanut butter.

In witness whereof, I subscribe my signature.

WALTER W. WILLISON.